United States Patent
Lin

(10) Patent No.: US 11,457,456 B2
(45) Date of Patent: Sep. 27, 2022

(54) METHOD FOR TRANSMITTING INFORMATION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Yanan Lin, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 238 days.

(21) Appl. No.: 16/703,684

(22) Filed: Dec. 4, 2019

(65) Prior Publication Data
US 2020/0107333 A1   Apr. 2, 2020

Related U.S. Application Data

(63) Continuation of application No. PCT/CN2018/082024, filed on Apr. 4, 2018.

(51) Int. Cl.
*H04W 72/10*   (2009.01)
*H04L 1/00*   (2006.01)
(Continued)

(52) U.S. Cl.
CPC .......... *H04W 72/10* (2013.01); *H04L 1/0026* (2013.01); *H04W 24/10* (2013.01); *H04W 72/0413* (2013.01); *H04W 72/0446* (2013.01)

(58) Field of Classification Search
CPC . H04W 72/10; H04W 24/10; H04W 72/0413; H04W 72/0446; H04W 28/04;
(Continued)

(56) References Cited

U.S. PATENT DOCUMENTS

2017/0257156 A1   9/2017  Ko et al.
2018/0338339 A1*  11/2018 Song ................... H04W 76/14
2021/0037526 A1*  2/2021  Takeda ............. H04W 72/1268

FOREIGN PATENT DOCUMENTS

CN   103580818 A   *  2/2014  ........... H04L 5/0035
CN   103580818 A     2/2014
(Continued)

OTHER PUBLICATIONS

Second Office Action of corresponding Chinese application No. 201880003221.0, dated Oct. 10, 2020.
(Continued)

*Primary Examiner* — Chi H Pham
*Assistant Examiner* — Raul Rivas
(74) *Attorney, Agent, or Firm* — Ladas & Parry, LLP

(57) ABSTRACT

Embodiments of the present application provide a method for transmitting information, a terminal device and a network device, the method includes: a terminal device determines target CSI to-be-reported to a network device according to a second PUCCH resource for transmitting collision CSI if at least two first PUCCH resources in multiple first physical uplink control channel (PUCCH) resources for carrying channel state information (CSI) overlap at least partially in a time domain; and the terminal device reports the target CSI to the network device through the second PUCCH resource.

12 Claims, 7 Drawing Sheets

200

If at least two first PUCCH resources in multiple first PUCCH resources for carrying channel state information (CSI) overlap at least partially in a time domain, a terminal device determines target to-be-reported CSI to a network device according to second PUCCH resource for transmitting collision CSI — S210

The terminal device reports the target CSI to the network device through the second PUCCH resource — S220

(51) Int. Cl.
*H04W 24/10* (2009.01)
*H04W 72/04* (2009.01)

(58) Field of Classification Search
CPC ... H04L 1/0026; H04L 1/0027; H04L 5/0057; H04L 1/0009
See application file for complete search history.

(56) References Cited

FOREIGN PATENT DOCUMENTS

| | | | | |
|---|---|---|---|---|
| CN | 103947246 A | | 7/2014 | |
| CN | 106664520 A | * | 5/2017 | ............... H04L 5/00 |
| CN | 106664520 A | | 5/2017 | |
| CN | 107734688 A | | 2/2018 | |
| WO | 2019191982 A1 | | 10/2019 | |

OTHER PUBLICATIONS

CATT, 3GPP TSG RAN WG1 Meeting #92bis, R1-1803755; Remaining aspects of UCI multiplexing on PUSCH, Sanya, China, Apr. 16-20, 2018.
Vivo, 3GPP TSG RAN WG1 Meeting #92bis, R1-1803816; Remaining issues on CSI reporting, Sanya, China, Apr. 16-20, 2018.
Vivo, 3GPP TSG RAN WG1 Meeting #92bis, R1-1803834; Remaining issues on UCI multiplexing, Sanya, China, Apr. 16-20, 2018.
MediaTek Inc.3GPP TSG RAN WG1 Meeting #92bis, R1-1804067; Remaining issues of UCI on PUSCH, Sanya, China, Apr. 16-20, 2018.
Lenovo, Motorola Mobility, 3GPP TSG RAN WG1 Meeting #92bis, R1-1804213; Multiplexing between PUCCH and PUSCH, Sanya, China, Apr. 16-20, 2018.
Nokia, Nokia Shanghai Bell, 3GPP TSG RAN WG1 Meeting #92bis, R1-1804460; Remaining open items on UCI multiplexing, Sanya, China, Apr. 16-20, 2018.
Panasonic, 3GPP TSG RAN WG1 Meeting #92bis, R1-1804482; Discussion on partial overlap between PUCCH and PUSCH, Sanya, China, Apr. 16-20, 2018.
Qualcomm Incorporated, 3GPP TSG RAN WG1 Meeting #92bis, R1-1804804; Remaining issues for multiplexing UCI on PUSCH, Sanya, China, Apr. 16-20, 2018.
Vivo, 3GPP TSG RAN WG1 Meeting #93, R1-1806043; Remaining issues on CSI reporting, Busan, China, May 21-25, 2018.
Ericsson, 3GPP TSG-RAN WG1 Meeting #93, R1-1806216; Corrections and clarifications for CSI reporting, Busan, Korea, May 21-25, 2018.
Spreadtrum Communications, 3GPP TSG RAN WG1 Meeting #93, R1-1806400; Remaining details on short-PUCCH, Busan, Korea, May 21-25, 2018.
LG Electronics, 3GPP TSG RAN WG1 Meeting #93, R1-1806620; Remaining issues on short-duration PUCCH, Busan, Korea, May 21-25, 2018.
Ericsson, 3GPP TSG RAN WG1 Meeting#93, R1-1807251; On UCI Multiplexing on PUCCH,Busan, South Korea, May 21-25, 2018.
The EESR of corresponding European application No. 18913240.0, dated Jul. 28, 2020.
NTT DOCOMO:"Remaining issues on CSI reporting", 3GPP Draft; R1-1802470 CSI Reporting, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 17, 2018(Feb. 17, 2018), XP051397976.
NEC: "Remaining issues on multi-CSI PUCCH", 3GPP Draft; R1-1801901 Remaining Issues on Multi-CSI PUCCH, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 15, 2018(Feb. 15, 2018), XP051396821.
Ericsson:"Summary of CSI reporting v3", 3GPP Draft; R1-1803301 Summary of CSI Reporting V3, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 26, 2018(Feb. 26, 2018), XP051398414.
First Office Action of corresponding Chinese application No. 201880003221.0, dated Jun. 2, 2020, with search report.
International Search Report in the international application No. PCT/CN2018/082024, dated Jan. 15, 2019.
Written Opinion of the International Search Authority in the international application No. PCT/CN2018/682024, dated Jan. 15, 2019 with English translation provided by Google Translate.

* cited by examiner

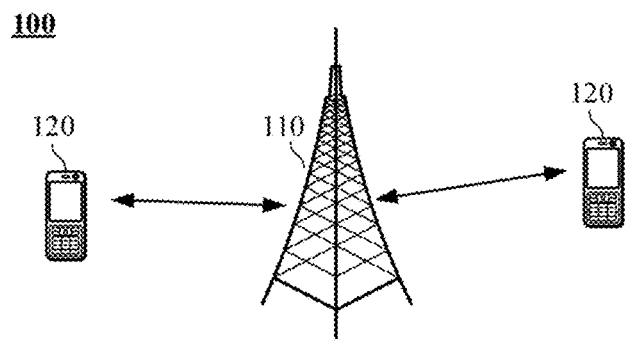

If at least two first PUCCH resources in multiple first PUCCH resources for carrying channel state information (CSI) overlap at least partially in a time domain, a terminal device determines target to-be-reported CSI to a network device according to second PUCCH resource for transmitting collision CSI ⎯S210

The terminal device reports the target CSI to the network device through the second PUCCH resource ⎯S220

FIG. 2

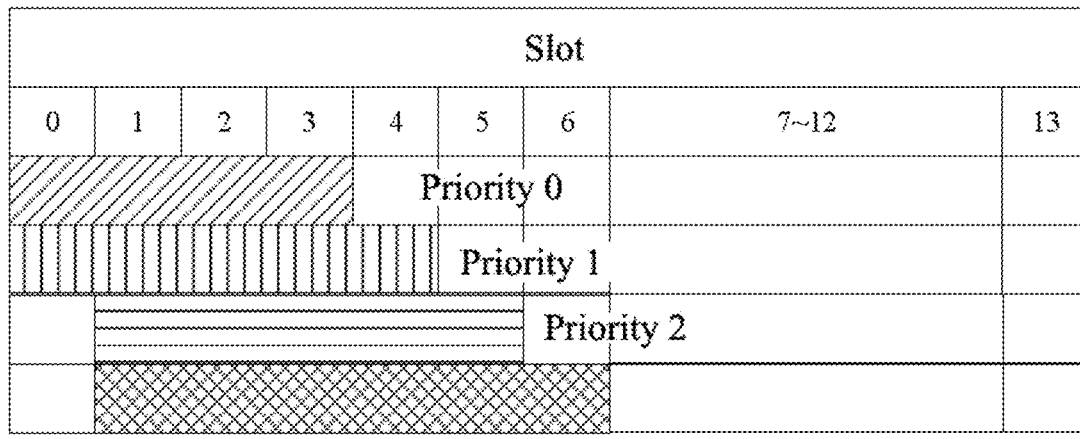
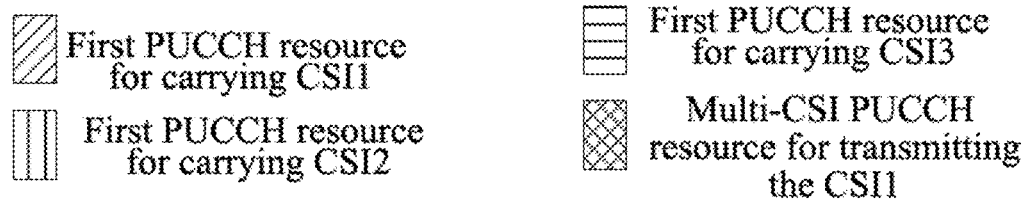
FIG. 7
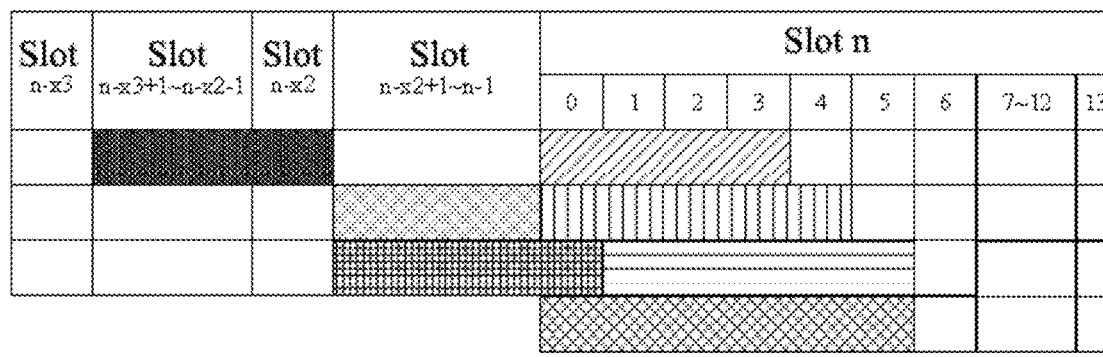
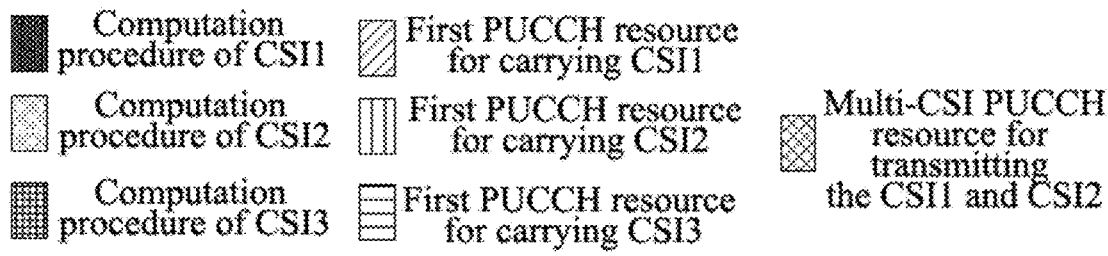
FIG. 8

| Slot n-x3 | Slot n-x3+1~n-x2-1 | Slot n-x2 | Slot n-x2+1~n-1 | Slot n | | | | | | | |
|---|---|---|---|---|---|---|---|---|---|---|---|
| | | | | 0 | 1 | 2 | 3 | 4 | 5 | 6~12 | 13 |
| | Priority 1 | | | | | | | | | | |
| | Priority 0 | | | | | | | | | | |

- ■ Computation procedure of CSI1
- ▨ First PUCCH resource for carrying CSI1
- ▦ Computation procedure of CSI2
- ▥ First PUCCH resource for carrying CSI2
- ▦ Computation procedure of CSI3
- ▤ First PUCCH resource for carrying CSI3
- ▩ Multi-CSI PUCCH resource for transmitting the CSI1 and CSI2

A network device sends first information to a terminal device, the first information including information of multiple first physical uplink control channel (PUCCH) resources for carrying channel state information (CSI) in multiple cycles, where at least two first PUCCH resources in the multiple first PUCCH resources for carrying the CSI overlap at least partially in a time domain — S310

The network device sends second information to the terminal device, where the second information includes information of a second PUCCH resource for carrying collision CSI — S320

FIG. 10

METHOD FOR TRANSMITTING INFORMATION, TERMINAL DEVICE AND NETWORK DEVICE

CROSS-REFERENCE TO RELATED APPLICATIONS

This application is a continuation application of the International application PCT/CN2018/082024, filed on Apr. 4, 2018, entitled "METHOD FOR TRANSMITTING INFORMATION, TERMINAL DEVICE AND NETWORK DEVICE", the content of which is hereby incorporated by reference in its entirety.

TECHNICAL FIELD

Embodiments of the present application relate to the field of communication, and more specifically, to a method for transmitting information, a terminal device and a network device.

BACKGROUND

In a 5G new radio (NR) system, a terminal device can report channel state information (CSI), and the terminal device may report the CSI cyclically, quasi-cyclically, or non-cyclically. A physical uplink control channel (PUCCH) resource for reporting the CSI is semi-statically configured through higher-layer signaling, therefore these semi-statically configured resources may overlap at some time, in which the CSI carried on an overlapping PUCCH resource is called a collision CSI.

Since a terminal device does not support transmitting different PUCCHs at the same time, the concept of multiple CSI (multi-CSI) PUCCH resources is introduced for transmitting the collision CSI, and therefore, which collision CSI is transmitted through the multi-CSI PUCCH resource is a problem worth studying.

SUMMARY

Embodiments of the present application provide a method for transmitting information, a terminal device and a network device, which can determine target CSI reported by a network device according to a PUCCH resource for transmitting collision CSI.

A first aspect provides a method for transmitting information, including: if at least two first physical uplink control channel (PUCCH) resources in multiple first PUCCH resources for carrying channel state information (CSI) overlap at least partially in a time domain, determining, by a terminal device, target CSI to-be-reported to a network device according to a second PUCCH resource for transmitting collision CSI; and reporting, by the terminal device, the target CSI to the network device through the second PUCCH resource.

Therefore, according to the method for transmitting information in the embodiment of the present application, the terminal device can determine the target CSI to-be-reported to the network device according to the second PUCCH resource for transmitting the collision CSI in the case where the PUCCH resources for carrying the CSI overlap.

In some possible implementations, the determining, by a terminal device, target CSI to-be-reported to a network device according to a second PUCCH resource for transmitting collision CSI includes: determining, by the terminal device, the target CSI to-be-reported to the network device according to a starting position of the second PUCCH resource.

In some possible implementations, the determining, by the terminal device, the target CSI to-be-reported to the network device according to a starting position of the second PUCCH resource includes:

if there exists, in the multiple first PUCCH resources, at least one first PUCCH resource of which a starting position is no later than the starting position of the second PUCCH resource, determining, by the terminal device, CSI carried in the at least one first PUCCH resource as the target CSI.

Therefore, the terminal device determines all the CSI carried in the first PUCCH resource satisfying the condition as the target CSI, thereby feeding more CSI back to the network device, thus providing more reference information for the network device to determine transmitting parameters for subsequent transmissions, for example, a beam and a modulation and coding scheme (MCS) and a PRB, etc.

In some possible implementations, the determining, by the terminal device, the target CSI to-be-reported to the network device according to a starting position of the second PUCCH resource includes: if there exists, in the multiple first PUCCH resources, at least one first PUCCH resource of which a starting position is no later than the starting position of the second PUCCH resource, determining, by the terminal device, CSI carried in at least one first PUCCH resource with an earliest or a latest starting position in the at least one first PUCCH resource as the target CSI.

In some possible implementations, the determining, by the terminal device, the target CSI to-be-reported to the network device according to a starting position of the second PUCCH resource includes: determining, by the terminal device, the target CSI according to the starting position of the second PUCCH resource and priorities of the CSI carried in the multiple first PUCCH resources.

Therefore, the terminal device in the embodiments of the present application can determine the reported CSI in combination with the priorities of the CSI, which is beneficial for effective reporting of the CSI with a higher priority.

In some possible implementations, the determining, by the terminal device, the target CSI according to the starting position of the second PUCCH resource and priorities of the CSI carried in the multiple first PUCCH resources includes: if there exists, in the multiple first PUCCH resources, at least one first PUCCH resource of which a starting position is no later than the starting position of the second PUCCH resource, determining, by the terminal device, the target CSI according to priorities of CSI carried in the at least one first PUCCH resource.

In some possible implementations, the determining, by the terminal device, the target CSI according to priorities of CSI carried in the at least one first PUCCH resource includes: determining, by the terminal device, at least one CSI with a highest priority in the CSI carried in the at least one first PUCCH resource as the target CSI.

In some possible implementations, determining, by the terminal device, at least one CSI with a highest priority in the CSI carried in the at least one first PUCCH resource as the target CSI: if there exists, in the multiple first PUCCH resources, at least one first PUCCH resource of which a starting position is no later than the starting position of the second PUCCH resource, determining, by the terminal device, the target CSI according to priorities of CSI carried in a first PUCCH resource with an earliest or a latest starting position in the at least one first PUCCH resource.

In some possible implementations, the determining, by the terminal device, the target CSI according to priorities of CSI carried in a first PUCCH resource with an earliest or a latest starting position in the at least one first PUCCH resource includes: determining, by the terminal device, CSI with a highest priority in the CSI carried in the first PUCCH resource with the earliest starting position or the latest starting position as the target CSI.

In some possible implementations, the determining, by the terminal device, the target CSI to-be-reported to the network device according to a starting position of the second PUCCH resource includes: determining, by the terminal device, the target CSI according to the starting position of the second PUCCH resource and measuring positions of multiple CSI carried in the multiple first PUCCH resources, where the multiple first PUCCH resources correspond to the multi-CSI one by one.

In some possible implementations, the determining, by the terminal device, the target CSI according to the starting position of the second PUCCH resource and measuring positions of multiple CSI carried in the multiple first PUCCH resources includes: determining, according to a measuring position of each of CSI in the multiple CSI and a computation time of each of the CSI, a computation end position of each of the CSI; and determining, by the terminal device, the target CSI according to the starting position of the second PUCCH resource and the computation end position of each of the CSI.

In some possible implementations, the determining, by the terminal device, the target CSI according to the starting position of the second PUCCH resource and the computation end position of each of the CSI includes: if there exists, in the multiple CSI, at least one CSI of which a computation end position is no later than the starting position of the second PUCCH resource, determining, by the terminal device, the at least one CSI as the target CSI.

In some possible implementations, the determining, by the terminal device, the target CSI according to the starting position of the second PUCCH resource and the computation end position of each of the CSI includes: if there exists, in the multiple CSI, at least one CSI of which a computation end position is no later than the starting position of the second PUCCH resource, determining, by the terminal device, CSI with an earliest computation end position in the at least one CSI as the target CSI.

In some possible implementations, the determining, by the terminal device, the target CSI according to the starting position of the second PUCCH resource and the computation end position of each of the CSI includes: determining, by the terminal device, the target CSI according to the starting position of the second PUCCH resource and the computation end position of each of the CSI, and a priority of each of the CSI.

In some possible implementations, the determining, by the terminal device, the target CSI according to the starting position of the second PUCCH resource and the computation end position of each of the CSI, and a priority of each of the CSI includes: if there exists, in the multiple CSI, at least one CSI of which a computation end position is no later than the starting position of the second PUCCH resource, determining, by the terminal device, the target CSI according to a priority of the at least one CSI.

In some possible implementations, the determining, by the terminal device, the target CSI according to a priority of the at least one CSI includes: determining, by the terminal device, CSI with a highest priority in the at least one CSI as the target CSI.

In some possible implementations, the determining, by the terminal device, the target CSI according to the starting position of the second PUCCH resource and the computation end position of each of the CSI, and a priority of each of the CSI includes:

if there exists, in the multiple CSI, at least one CSI of which a computation end position is no later than the starting position of the second PUCCH resource, determining, by the terminal device, the target CSI according to priorities of CSI with an earliest computation end position in the at least one CSI.

In some possible implementations, the determining, by the terminal device, the target CSI according to a priority of CSI with an earliest computation end position in the at least one CSI includes determining, by the terminal device, CSI with a highest priority in the CSI with the earliest computation end position in the at least one CSI as the target CSI.

In some possible implementations, the determining, according to a measuring position of each of CSI in the multiple CSI and a computation time of each of the CSI, a computation end position of each of the CSI includes:

determining, by the terminal device, a position of a specific duration after the measuring position of each of the CSI as the computation end position of each of the CSI, where the specific duration is a sum of timing advanced TA and the computation time of each of the CSI.

In some possible implementations, the starting position of the second PUCCH resource is a starting symbol of the second PUCCH resource.

In some possible implementations, the method further includes: receiving, by the terminal device, first information sent by the network device, where the first information includes information of the multiple first PUCCH resources for carrying the CSI in multiple cycles.

In some possible implementations, the first information further includes information of measuring resources for CSI measuring in the multiple cycles.

In some possible implementations, a type of the multiple cycles includes at least one of the following: cyclical, quasi-cyclical, and non-cyclical.

In some possible implementations, the method further includes: receiving, by the terminal device, second information sent by the network device, where the second information includes information of a second PUCCH resource for carrying collision CSI.

In some possible implementations, the information of the second PUCCH resource includes at least one of the following:

a starting symbol in the time domain, a duration in the time domain, a starting physical resource block PRB in a frequency domain and a number of consecutive PRB in the frequency domain of the second PUCCH resource.

In some possible implementations, the at least two first physical uplink control channel PUCCH resources in multiple first PUCCH resources for carrying channel state information CSI overlap at least partially in a time domain includes: there exists at least two first PUCCH resources in the multiple first PUCCH resources overlapping on at least one symbol in the time domain.

A second aspect provides a method for transmitting information, including: sending, by a network device, first information to a terminal device, the first information including information of multiple first physical uplink control channel PUCCH resources for carrying channel state information CSI in multiple cycles, where at least two first PUCCH resources in the multiple first PUCCH resources for carrying the CSI overlap at least partially in a time domain;

and sending, by the network device, second information to the terminal device, where the second information includes information of a second PUCCH resource for carrying collision CSI.

In some possible implementations, the first information further includes information of measuring resources for CSI measuring in the multiple cycles.

In some possible implementations, a type of multiple cycles includes at least one of the following: cyclical, quasi-cyclical, and non-cyclical.

In some possible implementations, the information of the second PUCCH resource includes at least one of the following:

a starting symbol in the time domain, a duration in the time domain, a starting physical resource block PRB in a frequency domain and a number of consecutive PRB in the frequency domain of the second PUCCH resource.

A third aspect provides a terminal device for performing the first aspect or the method in any possible implementations of the first aspect described above. Specifically, the terminal device includes a unit for executing the first aspect or the method in any possible implementations of the first aspect described above.

A fourth aspect provides a terminal device including a memory, a processor, an input interface and an output interface. Where the memory, the processor, the input interface and the output interface are connected through a bus system. The memory is configured to store instructions, and the processor is configured to execute the instructions stored in the memory to execute the first aspect or the method in any possible implementations of the first aspect described above.

A fifth aspect provides a network device for performing the second aspect or the method in any possible implementations of the second aspect described above. Specifically, the network device includes a unit for executing the second aspect or the method in any possible implementations of the second aspect described above.

A sixth aspect provides a network device which includes a memory, a processor, an input interface and an output interface. Where the memory, the processor, the input interface and the output interface are connected by a bus system. The memory is configured to store instructions, and the processor is configured to execute the instructions stored in the memory to execute the second aspect or the method in any possible implementations of the second aspect described above.

A seventh aspect provides a computer storage medium for storing computer software instructions which are configured to execute the first aspect or the method in any possible implementations of the first aspect described above, the computer storage medium including a program designed to execute the above aspects.

An eighth aspect provides a computer program product including instructions, which, when running on a computer, cause the computer to execute the first aspect or the method in any possible implementations of the first aspect described above.

A ninth aspect provides a computer storage medium for storing computer software instructions which are configured to execute the second aspect or the method in any possible implementations of the second aspect described above, the computer storage medium including a program designed to execute the above aspects.

A tenth aspect provides a computer program product including instructions, which, when running on a computer, cause the computer to execute the second aspect or the method in any possible implementations of the second aspect described above.

BRIEF DESCRIPTION OF DRAWINGS

FIG. 1 illustrates a schematic diagram of an application scenario according to an embodiment of the present application.

FIG. 2 illustrates a schematic flowchart of a method for transmitting information according to an embodiment of the present application.

FIG. 7 illustrates a schematic diagram according to another example of a manner for determining the target CSI.

FIG. 8 illustrates a schematic diagram according to another example of a manner for determining the target CSI.

FIG. 9 illustrates a schematic diagram according to another example of a manner for determining the target CSI.

FIG. 10 illustrates a schematic flowchart of a method for transmitting information according to another embodiment of the present application.

DESCRIPTION OF EMBODIMENTS

Figure 3:
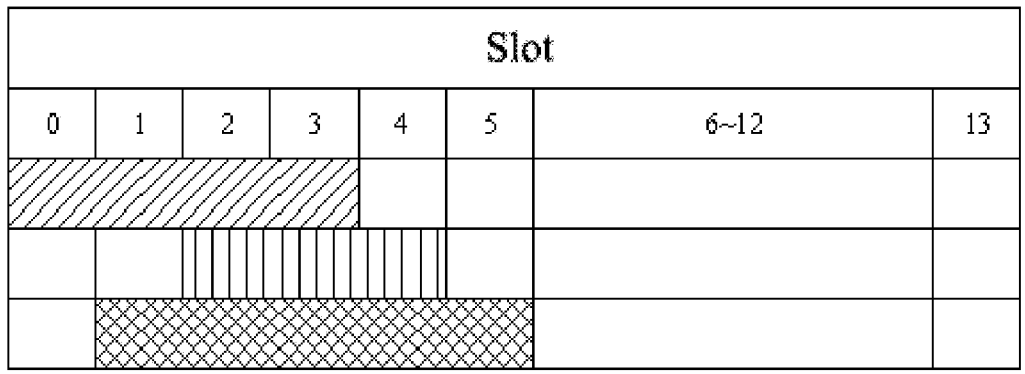
FIG. 3 illustrates a schematic diagram according to an example of a manner for determining the target CSI.

The technical scheme in the embodiments of the present application will be described below in conjunction with the appended drawings.

The technical solutions of the embodiments of the present application can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS) and a 5G communication system in future, etc.

FIG. 1 illustrates a wireless communication system 100 applied in the embodiments of the present application. The wireless communication system 100 may include a network device 110. The network device 110 may be a device that communicates with a terminal device. The network device 110 can provide a communication coverage for a specific geographical area and can communicate with the terminal device (such as a UE) located in the coverage area. In an implementation, the network device 110 may be a base transceiver station (BTS) in a GSM system or a CDMA system, or may be a NodeB (NB) in a WCDMA system, or may be an evolutional Node B (eNB or eNodeB) in an LTE system, or the network device may be a relay station, an access point, an in-vehicle device, a wearable device, and a network side device in a future 5G network or a future evolved public land mobile network (PLMN), etc.

The wireless communication system 100 also includes at least one terminal device 120 located within the coverage of the network device 110. The terminal device 120 may also refer to user equipment (UE), an access terminal, a subscriber unit, a subscriber station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (SIP) phone, a wireless local loop (WLL) station, a personal digital assistant (PDA), a handheld device with a function of wireless communication, a computing device or another processing device connected to a wireless modem, an in-vehicle device, a wearable device, a terminal device in a future 5G network, or a terminal device in a future evolved PLMN, etc.

FIG. 2 shows a method 200 according to an embodiment of the present application which may be executed by the terminal device in the communication system 100 shown in FIG. 1. As shown in FIG. 2, the method 200 may include the following contents:

S210: if at least two first PUCCH resources in multiple first PUCCH resources for carrying channel state information (CSI) overlap at least partially in a time domain, a terminal device determines target to-be-reported CSI to a network device according to second PUCCH resource for transmitting collision CSI.

S220: the terminal device reports the target CSI to the network device through the second PUCCH resource.

In the embodiments of the present application, the multiple first PUCCH resources may correspond to multiple cycles, in an implementation, lengths of the multiple cycles may be the same or different, i.e., a type of the multiple cycles may include at least one of the following: cyclical, quasi-cyclical, or non-cyclical.

As an example rather than a limitation, the information of each first PUCCH resource may include at least one of the following: a starting symbol in the time domain, a duration in the time domain, a starting physical resource block (PRB) in a frequency domain and the number of consecutive PRB in the frequency domain, an ending PRB in the frequency domain of the first PUCCH resource.

In the embodiments of the present application, the information of the multiple first PUCCH resources may be configured by the network device, for example, the network device may send first information to the terminal device, and the first information may include the information of the multiple first PUCCH resources. In an implementation, the first information may also include information of measuring resources for CSI measuring in multiple cycles.

As an example rather than a limitation, the information of the measuring resource for the CSI measuring may include at least one of the following: a starting symbol in the time domain, a duration in the time domain, a starting PRB in a frequency domain and the number of consecutive PRB in the frequency domain, an ending PRB in the frequency domain of the measuring resource for the CSI measuring, etc.

That is to say, the network device may configure the measuring resource for the CSI measuring within the multiple cycles and PUCCH resources for CSI feedback within the multiple cycles to the terminal device, so that the terminal device may use the measuring resource in each cycle for CSI measuring, and then perform the CSI feedback based on PUCCH resource in each of the cycles.

In the embodiments of the present application, at least two first PUCCH resources in the multiple first PUCCH resources for CSI feedback overlap at least partially in the time domain.

It should be understood that the overlap here may be in terms of time slots, orthogonal frequency division multiple (OFDM) symbols, or other time units, which are not limited by the embodiments of the present application.

For example, where the at least two first PUCCH resources in the multiple first PUCCH resources for CSI feedback overlap at least partially in time domain may include: there exists at least two first PUCCH resources in the multiple first PUCCH resources for carrying CSI overlapping on at least one OFDM symbol in the time domain.

In an implementation, the collision CSI in the embodiments of the present application may be CSI carried in the at least one OFDM symbol overlapped. That is to say, the collision CSI may be considered as the CSI carried in the overlapping first PUCCH resources. For example, if a first PUCCH resource for transmitting CSI1 and a first PUCCH resource for transmitting CSI2 overlap, CSI1 and CIS2 may be considered as the collision CSI.

In the embodiments of the present application, the network device may also configure, for the terminal device, a second PUCCH resource for transmitting the collision CSI, in an implementation, the second PUCCH resource may be an existing multi-CSI PUCCH resource. For example, the network device may send second information to the terminal device, which carries information of the second PUCCH resource, thereby notifying the terminal device of the information of the second PUCCH resource.

In the embodiments of the present application, the information of the second PUCCH resource includes at least one of the following:

a starting symbol in the time domain, a duration in the time domain, a starting physical resource block PRB in a frequency domain and a number of consecutive PRB in the frequency domain of the second PUCCH resource.

In the embodiments of the present application, when at least two PUCCH resources in the multiple first PUCCH resources for carrying CSI overlap at least partially, the terminal device may determine to report which CSI to a network device based on the second PUCCH resource for transmitting collision CSI. It should be understood that the embodiments of the present application do not specifically limit the size of the second PUCCH resource, for example, the second PUCCH resource may satisfy reporting of all CSI, or may not satisfy the reporting of all the CSI, that is, the embodiments of the present application may be applied to a scenario where the second PUCCH resource can satisfy the reporting of all the CSI, or be applied to a scenario where the second PUCCH resource cannot satisfy the reporting of all the CSI.

In an implementation, if the second PUCCH resource may satisfy the reporting of all the CSI, the terminal device may report all the CSI, or determine the to-be-reported CSI according to priorities of the CSI and/or positions of the first PUCCH resources, or, if the second PUCCH resource cannot satisfy the reporting of all the CSI, the terminal device may also determine the to-be-reported CSI based on the priorities of CSI and/or the positions of the first PUCCH resources.

In an implementation, the terminal device may select CSI with the highest priority for reporting according to an order of the priorities, or determine the to-be-reported CSI according to an order of starting positions of the first PUCCH resources, and if there are a plurality of first PUCCH resources which share the same starting position, the network device may further determine the final to-be-reported CSI in combination with the priorities of CSI, or the terminal device may also first determine the to-be-reported CSI according to the priorities of CSI, and further determine the final to-be-reported CSI in combination with the positions of the first PUCCH resources, where the specific determining method is not limited in the embodiments of the present application.

For example, the terminal device may report the CSI with the highest priority, or CSI carried in a first PUCCH resource with the earliest starting position, or CSI carried in a first PUCCH resource with the latest starting position, or if two first PUCCH resources share the same starting position, the terminal device may further determine the to-be-reported CSI in combination with the priorities of the CSI, or if two CSI share the same priority, the terminal device may determine the to-be-reported CSI in combination with the positions of the first PUCCH resources for carrying the CSI, for example, determine to report CSI with an earlier starting position, or determine to report CSI with a later starting position.

For example, the terminal device may determine the CSI to-be-reported to the network device based on starting positions of the multiple first PUCCH resources and a starting position of the second PUCCH resource, for example, if the starting position of the first PUCCH resource for carrying the CSI1 is earlier than the starting position of the second PUCCH resource, the terminal device may determine the CSI1 as the target CSI to-be-reported to the network device, or in an implementation, the terminal device may also determine the CSI to-be-reported to the network device based on sizes of the multiple first PUCCH resources and a size of the second PUCCH resource, for example, if the first PUCCH resource for carrying the CSI2 is smaller than the second PUCCH resource, the terminal device may determine to report the CSI2 to the network device and so on.

In the embodiments of the present application, S210 may include:

the terminal device determines the target CSI to-be-reported to the network device according to the starting position of the second PUCCH resource.

For example, the terminal device may determine the CSI to-be-reported to the network device according to a relationship between starting positions of the multiple first PUCCH resources and the starting position of the second PUCCH resource, and in an implementation, the terminal device may determine, in the first PUCCH resources whose starting positions are earlier than the starting position of the second PUCCH resource, a certain number or a certain proportion of the first PUCCH resources (denoted as a target first PUCCH resource), and then determine CSI carried in the target first PUCCH resource as the target CSI to-be-reported to the network device. For example, if the starting positions of the first PUCCH resources for carrying CSI1, CSI2 and CSI3 are all earlier than the starting position of the second PUCCH resource, that is, the target first PUCCH resources may include the first PUCCH resource for carrying the CSI1, the first PUCCH resource for carrying the CSI2 and the first PUCCH resource for carrying the CSI3, then one or more of the first PUCCH resources are selected from the target first PUCCH resources, for example, the first PUCCH resource for carrying the CSI1, CSI carried in the first resource for carrying the CSI1 is further determined as the target CSI, that is, the CSI1 is determined as the target CSI.

In the following, the determination manner of the target CSI will be described in conjunction with specific embodiments.

Embodiment 1

In Embodiment 1, the terminal device determines the target CSI to-be-reported to the network device according to the starting position of the second PUCCH resource includes:

if there exists, in the multiple first PUCCH resources, at least one first PUCCH resource of which a starting position is no later than the starting position of the second PUCCH resource (denoted as a first condition), the terminal device determines CSI carried in the at least one first PUCCH resource as the target CSI.

Specifically, the terminal device may compare the starting positions of the multiple first PUCCH resources and the starting position of the second PUCCH resource, and determine the first PUCCH resource in the multiple first PUCCH resources whose starting position is no later than the starting position of the second PUCCH resource, and if there exists, in the multiple first PUCCH resources, one or more first PUCCH resources with a starting position which is no later than the starting position of the second PUCCH resource, the terminal device may determine CSI carried in the one or more first PUCCH resources as the target CSI to-be-reported to the network device.

That is to say, the terminal device may select, in the multiple first PUCCH resources, the first PUCCH resource whose starting position is no later than the starting position of the second PUCCH resource, and determine it as a candidate first PUCCH resource, and further determine CSI carried in the candidate first PUCCH resource as the target CSI.

Therefore, the terminal device determines the CSI carried in the first PUCCH resource satisfying the first condition as the target CSI, thereby feeding more CSI back to the network device, thus providing more reference information for the network device to determine transmission parameters of subsequent transmission, such as a beam, a modulation and coding schemes (MCS) and a PBR, etc.

For example, as shown in FIG. 3, the first PUCCH resource for carrying the CSI 1 includes symbols 0-3, that is, the starting symbol is a symbol 0; the first PUCCH resource for carrying the CSI 2 includes symbols 2-4, that is, the starting symbol is a symbol 2; the second PUCCH resource includes symbols 1-5, that is, the starting symbol is a symbol 1.

According to the determination manner described in Embodiment 1, the terminal device may determine that the starting position of the first PUCCH resource for carrying CST1 is earlier than the starting position of the second PUCCH resource, further determine the CST1 as the target CSI, and transmit the CST1 through the second PUCCH resource.

Figure 4:
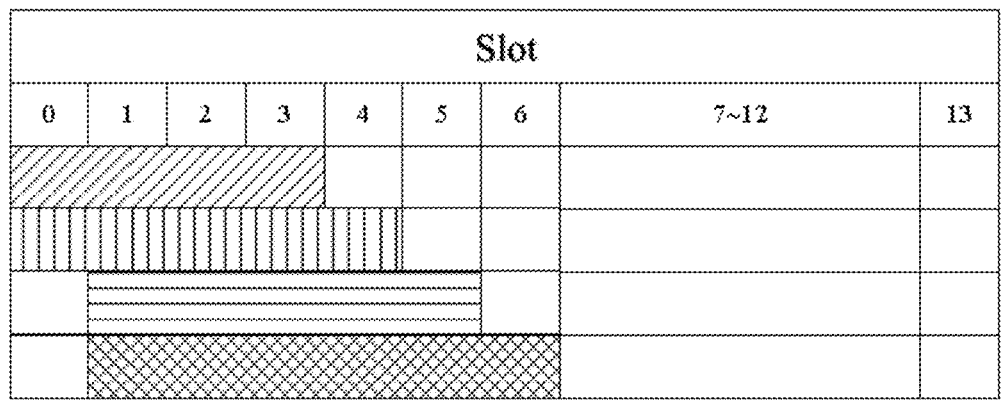
FIG. 4 illustrates a schematic diagram according to another example of a manner for determining the target CSI.

For example, as shown in FIG. 4, the first PUCCH resource for carrying CST1 includes symbols 0-3, i.e. the starting symbol is the symbol 0; the first PUCCH resource for carrying CSI2 includes symbols 0-4, i.e. the starting symbol is the symbol 0; the first PUCCH resource for carrying CSI 3 includes symbols 1-5, i.e. the starting symbol is the symbol 1; the second PUCCH resource includes symbols 1-6, that is, the starting symbol is the symbol 1.

According to the determination manner described in Embodiment 1, the terminal device may determine that the starting positions of the first PUCCH resources for carrying the CSI1, CSI2 and CSI3 are all no later than the starting position of the second PUCCH resource, further may determine that the CSI1, CSI2 and CSI3 are all target CSI, thus transmit the CSI1, CSI2 and CSI3 through the second PUCCH resource.

Embodiment 2

In Embodiment 2, the terminal device determines the target CSI to-be-reported to the network device according to the starting position of the second PUCCH resource includes:

if there exists, in the multiple first PUCCH resources, at least one first PUCCH resource of which a starting position is no later than the starting position of the second PUCCH resource, the terminal device determines CSI carried in at least one first PUCCH resource with the earliest or the latest starting position in the at least one first PUCCH resource as the target CSI.

Specifically, the terminal device may compare the starting positions of the multiple first PUCCH resources with the starting position of the second PUCCH resource, and determine the first PUCCH resource in the multiple first PUCCH resources whose starting position is no later than the starting position of the second PUCCH resource, and if there exists, in the multiple first PUCCH resources, one or more first PUCCH resources with a starting position which is no later than the starting position of the second PUCCH resource, the terminal device may select one or more first PUCCH resources with the earliest starting position from the one or more first PUCCH resources, and determine CSI carried in the one or more first PUCCH resources with the earliest starting position as the target CSI to-be-reported to the network device.

Alternatively, the terminal device may select one or more first PUCCH resources with the latest starting position in the one or more first PUCCH resources, and determine CSI carried in the one or more first PUCCH resources with the latest starting position as the target CSI to-be-reported to the network device.

That is to say, the terminal device may select, in the multiple first PUCCH resources, the first PUCCH resource whose starting position is no later than the starting position of the second PUCCH resource, determine it as a candidate first PUCCH resource, and further select, in the candidate first PUCCH resource, one or more first PUCCH resources with the earliest (or the latest) starting position, determine the CSI carried in the one or more first PUCCH resources as the target CSI.

Figure 5:
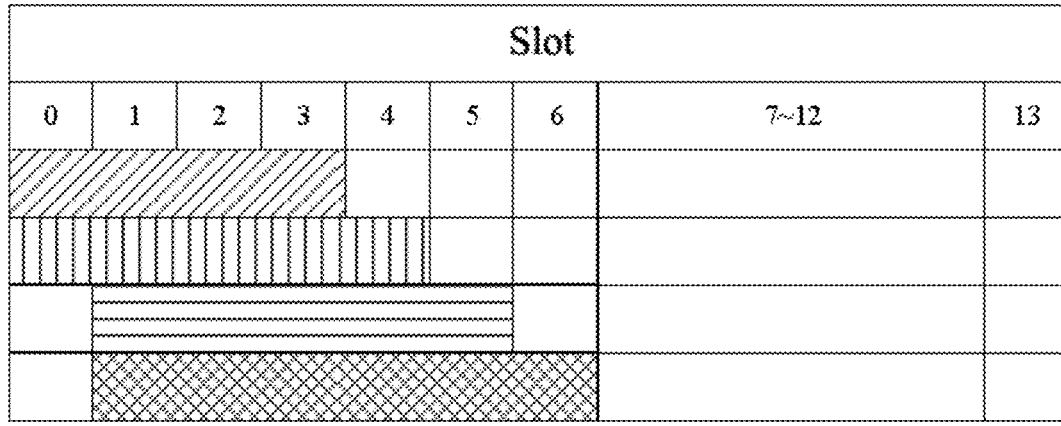
FIG. 5 illustrates a schematic diagram according to another example of a manner for determining the target CSI.

For example, as shown in FIG. 5, the first PUCCH resource for carrying CSI 1 includes symbols 0-3, i.e., the starting symbol is a symbol 0; the first PUCCH resource for carrying CSI2 includes symbols 0-4, i.e., the starting symbol is the symbol 0; and the first PUCCH resource for carrying CSI 3 includes symbols 1-5, i.e., the starting symbol is a symbol 1; the second PUCCH resource include symbols 1-6, i.e., the starting symbol is the symbol 1.

According to the determination manner described in Embodiment 2, the terminal device may determine that the starting positions of the first PUCCH resources for carrying CSI1, CSI 2 and CSI3 are all no later than the starting position of the second PUCCH resource, further select the first PUCCH resource with the earliest starting position in the three first PUCCH resources, where if the starting positions of the first PUCCH resources for carrying the CSI1 and the CSI2 are the same and are both the earliest, the terminal device may determine the CSI1 and the CSI2 as the target CSI, and transmit the CSI1 and the CSI2 through the second PUCCH resource.

Embodiment 3

In Embodiment 3, the terminal device determines the target CSI to-be-reported to the network device according to the starting position of the second PUCCH resource includes:

the terminal device determines the target CSI according to the starting position of the second PUCCH resource and priorities of the CSI carried in the multiple first PUCCH resources.

Specifically, the terminal device may compare the starting positions of the multiple first PUCCH resources with the starting position of the second PUCCH resource, and determine a first PUCCH resource in the multiple first PUCCH resources whose starting position is no later than the starting position of the second PUCCH resource, if there exists at least one first PUCCH resource in the multiple first PUCCH resources whose starting position is no later than the starting position of the second PUCCH resource, the at least one first PUCCH resource is determined as a candidate first PUCCH resource, furthermore, the terminal device may determine the target CSI to-be-reported to the network device in combination with the priorities of the CSI.

In the following, specific embodiments of Embodiment 3 will be described in combination with Embodiment 4 and Embodiment 5.

In Embodiment 4, the terminal device determines the target CSI according to the starting position of the second PUCCH resource and priorities of the CSI carried in the multiple first PUCCH resources includes:

if there exists, in the multiple first PUCCH resources, at least one first PUCCH resource of which a starting position is no later than the starting position of the second PUCCH resource, the terminal device determines the target CSI according to priorities of CSI carried in the at least one first PUCCH resource.

For example, one or more CSI with the highest priority in the CSI carried in the candidate first PUCCH resource may be determined as the target CSI, or one or more CSI with a priority higher than a specific priority (e.g., a priority 1) may be determined as the target CSI.

Figure 6:
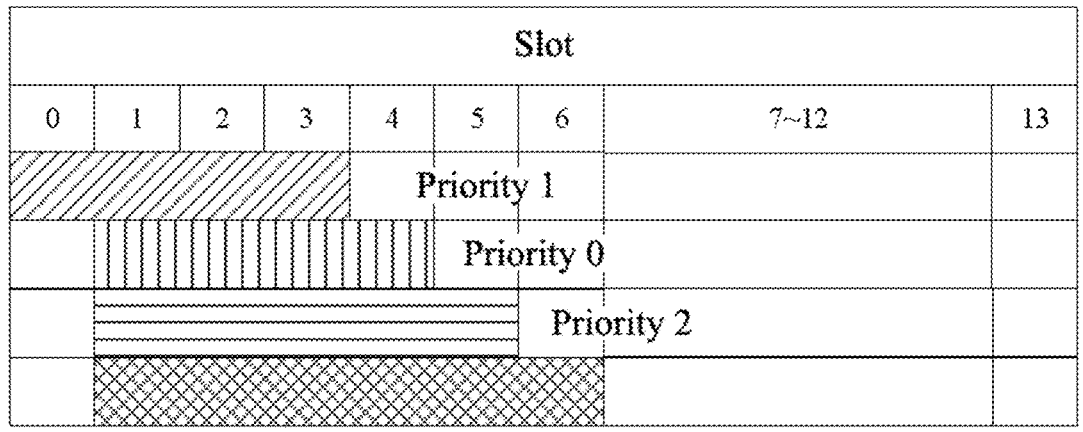
FIG. 6 illustrates a schematic diagram according to another example of a manner for determining the target CSI.

For example, as shown in FIG. 6, the first PUCCH resource for carrying CSI 1 includes symbols 0-3, i.e., the starting symbol is a symbol 0, and the priority of CSI1 is 1; the first PUCCH resource for carrying CSI2 includes symbols 1-4, i.e., the starting symbol is a symbol 1, and the priority of CSI2 is 0; the first PUCCH resource for carrying CSI3 includes symbols 1-5, i.e., the starting symbol is the symbol 1, and the priority of CSI3 is 2; the second PUCCH resource includes symbols 1-6, i.e., the starting symbol is the symbol 1.

According to the determination manner described in Embodiment 4, the terminal device may determine that the candidate first PUCCH resource includes all the first PUCCH resources, furthermore, determine the to-be-reported CSI in combination with the priorities of the CSI, for example, the terminal device may determine the CSI with the highest priority as the target CSI, that is, determine the CSI2 as the target CSI; or the terminal device may also determine the CSI with a priority higher than the specific priority (e.g., the priority 1) as the target CSI, that is to say, determine the CSI2 as the target CSI, and thus transmit the CSI2 through the second PUCCH resource.

In Embodiment 5, the terminal device determines the target CSI according to the starting position of the second PUCCH resource and priorities of the CSI carried in the multiple first PUCCH resources includes:

if there exists, in the multiple first PUCCH resources, at least one first PUCCH resource of which a starting position is no later than the starting position of the second PUCCH resource, the terminal device determines the target CSI according to priorities of the CSI carried in a first PUCCH resource with the earliest or latest starting position in the at least one of the first PUCCH resource.

Specifically, the terminal device may compare the starting positions of the multiple first PUCCH resources with the starting position of the second PUCCH resource, and determine the first PUCCH resource in the multiple first PUCCH resources whose starting position is no later than the starting position of the second PUCCH resource, if there exists, in the multiple first PUCCH resources, at least one first PUCCH whose starting position is no later than the starting position of the second PUCCH resource, the terminal device may determine one or more first PUCCH resources with the earliest or latest starting position in the at least one first PUCCH resource as a candidate first PUCCH resource, furthermore, determine the target CSI to-be-reported to the network device in combination with the priorities of CSI.

For example, the terminal device may determine at least one CSI with the highest priority in the CSI carried in the candidate first PUCCH resource as the target CSI, or determine one or more CSI with a priority higher than a specific priority (e.g., a priority 1) in the CSI carried in the candidate first PUCCH resource as the target CSI.

Therefore, in the embodiment of the present application, the terminal device may determine the target CSI to-be-reported in combination with the priorities of the CSI, thereby guaranteeing preferable reporting of the CSI with a higher priority, thus ensuring that the base station receives more useful information through the multi-CSI PUCCH resource.

For example, as shown in FIG. 7, the first PUCCH resource for carrying CSI 1 includes symbols 0-3 with a priority of 0 (Priority 0), and the first PUCCH resource for carrying CSI2 includes symbols 0-4 with a priority of 1 (Priority 1), the first PUCCH resource for carrying CSI 3 includes symbols 1-5 with a priority of 2 (Priority 2) and the second PUCCH resource includes symbols 1-6.

According to the determination manner described in Embodiment 5, the terminal device may determine that the starting positions of the first PUCCH resources for carrying the CSI1, CSI2 and CSI3 are all no later than the starting position of the second PUCCH resource, further select the first PUCCH resource with the earliest starting position in the three first PUCCH resources, since the starting positions of the first PUCCH resources for carrying the CSI1 and the CSI2 are the same and are both the earliest, that is to say, the candidate first PUCCH resource includes the first PUCCH resources for carrying the CSI1 and the CSI2, furthermore, the terminal device may determine that the priority of CSI1 is higher than that of CSI2, and thus determine the CSI1 as the target CSI and transmit the CST1 through the second PUCCH resource. Alternatively, the terminal device may determine, in the CSI carried in the candidate first PUCCH resource, the CSI with a priority higher than a specific priority as the target CSI, for example, if the specific priority is the priority 2, then the terminal device may determine that both CS1 and CSI2 are the target CSI.

Embodiment 6

In Embodiment 6, the terminal device determines the target CSI to-be-reported to the network device according to the starting position of the second PUCCH resource includes:

the terminal device determines the target CSI according to the starting position of the second PUCCH resource and measuring positions of multi-CSI carried in the multiple first PUCCH resources, where the multiple first PUCCH resources correspond to the multi-CSI one by one.

What can be known from the above description is that the network device may configure the measuring resource for CSI measuring for the terminal device, therefore, the terminal device may also determine the target CSI according to the starting position of the second PUCCH resource and the measuring position of the CSI, for example, the terminal device may determine the target CSI according to a time interval between the measuring position of the CSI and the starting position of the second PUCCH resource, for example, determine CSI corresponding to the measuring position with a time interval greater than a specific threshold as the target CSI.

In some embodiments, the terminal device determines the target CSI according to the starting position of the second PUCCH resource and the measuring position of multi-CSI carried in the multiple first PUCCH resources includes:

the terminal device determines according to a measuring position of each of CSI in the multi-CSI and a computation time of each of the CSI, a computation end position of each of the CSI; and the terminal device determines the target CSI according to the starting position of the second PUCCH resource and the computation end position of each of the CSI.

Specifically, after performing the CSI measuring, the terminal device may also process the measured CSI and wait for reporting CSI to the network device, therefore, the terminal device may determine the computation end positions of the CSI according to the measuring positions and the computation times of the CSI, and further determine the to-be-reported CSI according to the starting position of the second PUCCH resource and the computation end positions of the CSI, for example, determine CSI with the earliest computation end position as the target CSI, or CSI with a computation end position earlier than the starting position of the second PUCCH resource as the target CSI an so on.

Alternatively, the terminal device may determine the to-be-reported CSI according to priorities of CSI, for example, determine the to-be-reported CSI according to an order of the priorities, or the to-be-reported CSI further in combination with the priorities of CSI when there is multiple CSI with the earliest ending position.

In the following, several specific embodiments of Embodiment 6 will be described in combination with Embodiments 7 to 11.

In Embodiment 7, the terminal device determines the target CSI according to the starting position of the second PUCCH resource and the computation end position of each of the CSI includes:

if there exists, in the multiple CSI, at least one CSI of which a computation end position is no later than the starting position of the second PUCCH resource, the terminal device determines the at least one CSI as the target CSI.

In Embodiment 8, the terminal device determines the target CSI according to the starting position of the second PUCCH resource and the computation end position of each of the CSI includes:

if there exists, in the multiple CSI, at least one CSI of which a computation end position is no later than the starting position of the second PUCCH resource, the terminal device determines CSI with the earliest computation end position in the at least one CSI as the target CSI.

Specifically, after determining the computation end position of each CSI according to the measuring position and computation time of each CSI, the terminal device may further compare the computation end position of each CSI with the starting position of the second PUCCH resource, and denote at least one CSI as a first candidate CSI set if the computation end position of the at least one CSI is no later than the starting position of the second PUCCH resource, and in present Embodiment 7, the terminal device may determine CSI in the first candidate CSI set as the target CSI, alternatively, in Embodiment 8, the terminal device may also determine one or more CSI with the earliest computation termination position (denoted as a second candidate CSI set) in the first candidate CSI set as the target CSI.

For example, as shown in FIG. 8, the position of the measuring resource of CSI1 is a slot n−x3, and a slot n−x3+1 to a slot n−x2 includes the computation time of CSI1, in an implementation, it may also include timing advanced (TA), that is, the computation end position of CST1 is a slot n−x2.

The position of the measuring resource of CSI2 is the slot n−x2, and the slot n−x2+1 to a slot n−1 includes the computation time of CSI2, in an implementation, it may also include a TA, that is, the computation end position of CSI2 is the slot n−1.

The position of the measuring resource of CSI3 is the slot n−x2, and the symbol 1 in a slot n−x2+1 to a slot n includes the computation time of CSI3, in an implementation, it may also include a TA, that is, the computation end position of CSI3 is the symbol 1 in a slot n, and the starting position of the second PUCCH resource is the symbol 0 in the slot n.

According to the determination manner described in Embodiment 7, it may be determined that the computation end positions of CST1 and CSI2 are both earlier than the starting position of the second PUCCH resource, that is, the first candidate CSI set includes the CSI1 and CSI2, furthermore, the terminal device may determine the first candidate CSI set as the target CSI, and further may transmit the CSI1 and CSI2 through the second PUCCH resource.

According to the determination manner described in Embodiment 8, the terminal device may also determine, in the first candidate CSI set, the CSI with the earliest computation end position as the target CSI, that is to say, may determine that the second candidate CSI set includes the CSI1, and further transmit the CSI1 through the second PUCCH resource.

In Embodiment 9, the terminal device determines the target CSI according to the starting position of the second PUCCH resource and the computation end position of each of the CSI includes:

the terminal device determines the target CSI according to the starting position of the second PUCCH resource and the computation end position of each of the CSI, and a priority of each of the CSI.

In a specific embodiment of Embodiment 9 (denoted as Embodiment 10), the terminal device determines the target CSI according to the starting position of the second PUCCH resource and the computation end position of each of the CSI, and a priority of each of the CSI includes:

if there exists, in the multiple CSI, at least one CSI of which a computation end position is no later than the starting position of the second PUCCH resource, the terminal device determines the target CSI according to a priority of the at least one CSI.

In another specific embodiment of Embodiment 9 (denoted as Embodiment 11), the terminal device determines the target CSI according to the starting position of the second PUCCH resource and the computation end position of each of the CSI, and a priority of each of the CSI includes:

if there exists, in the multiple CSI, at least one CSI of which a computation end position is no later than the starting position of the second PUCCH resource, the terminal device determines the target CSI according to priorities of CSI with the earliest computation end position in the at least one CSI.

That is, the terminal device may determine one or more CSI with the highest priority in the first candidate CSI set aforementioned as the target CSI, which is corresponding to Embodiment 10, or one or more CSI with the highest priority in the second candidate CSI set as the target CSI, which is corresponding to Embodiment 11.

For example, as shown in FIG. 9, the position of the measuring resource of CSI1 is a slot n−x3, and a slot n−x3+1 to a slot n−x2 includes the computation time of CSI1, in an implementation, it may also include timing advanced (TA), that is, the computation end position of CSI1 is the slot n−x2, with a priority of 1 (Priority 1). The position of the measuring resource of CSI2 is the slot n−x2, and a slot n−x2+1 to a slot n−1 includes the computation time of CSI2, in an implementation, it may also include a TA, that is to say, the computation end position of CSI2 is the slot n−1, with a priority of 0 (Priority 0). The starting position of the second PUCCH resource is the symbol 0 in a slot n.

According to the determination manner described in Embodiment 10, the terminal device may determine that the computation end positions of CSI1 and CSI2 are earlier than the starting position of the second PUCCH resource, that is, the first candidate CSI set includes the CSI1 and CSI2.

In an implementation, the terminal device may determine the CSI with the highest priority in the first candidate CSI set as the target CSI, that is, determine the CSI2 as the target CSI, and further transmit the CSI2 through the second PUCCH resource.

In an implementation, the terminal device may also determine the CSI with a priority higher than a specific priority in the first candidate CSI set as the target CSI, for example, if the specific priority is a priority 2, the terminal device may determine the CSI1 and CSI2 as the target CSI, and further transmit the CSI1 and CSI2 through the second PUCCH resource.

According to the determination manner described in Embodiment 11, the terminal device may determine that the computation end positions of CST1 and CSI2 are both earlier than the starting position of the second PUCCH resource, where the computation end position of CSI1 is earlier than that of CSI2, the second candidate CSI set includes the CSI1.

In an implementation, if the second candidate CSI set includes multiple CSI, the terminal device may also determine CSI with the highest priority in the second candidate CSI set as the target CSI, or the CSI with a priority higher than a specific priority in the second candidate CSI set as the target CSI, etc.

Above all, the terminal device may determine the CSI carried in the first PUCCH resource (denoted as the first candidate PUCCH resource set) of the multiple first PUCCH resources with a starting position no later than the second PUCCH resource as the target CSI (corresponding to Embodiment 1), or determine the CSI carried in the first PUCCH resource with the earliest or latest starting position (denoted as the second candidate PUCCH resource set) in the first candidate PUCCH resource set as the target CSI (corresponding to Embodiment 2), alternatively, determine the target CSI in combination with priorities of the CSI (corresponding to Embodiment 3), for example, determine the target CSI (corresponding to Embodiment 4) according to the first candidate PUCCH resource set and the priorities of CSI, alternatively, determine the target CSI (corresponding to Embodiment 5) according to the second candidate PUCCH resource set and the priorities of CSI.

In an implementation, the terminal device may also determine the target CSI according to the starting position of the second PUCCH resource and the computation end positions of the CSI (corresponding to Embodiment 6), for example, the terminal device may determine the CSI with the computation end position no later than the starting position of the second PUCCH resource (denoted as the first candidate CSI set) as the target CSI (corresponding to Embodiment 7), or may determine the CSI with the earliest or the latest starting position in the first candidate CSI set (denoted as the second candidate CSI set) as the target CSI (corresponding to Embodiment 8), or may determine the target CSI in combination with the priorities of CSI (corresponding to embodiment 9), for example, may determine the target CSI according to the first candidate CSI set and the priorities of CSI (corresponding to Embodiment 10), or, may determine the target CSI according to the second candidate CSI set and the priorities of CSI (corresponding to Embodiment 11).

It should be understood that FIGS. 3 to 9 are illustrated where the starting position is in a unit of symbol, of course, the starting position of the PUCCH resource may also be illustrated in the unit of other time units, such as, a time slot or a micro-time slot, which is not limited by the embodiments of the present application.

In combination with FIGS. 2 to 9, a method for transmitting information according to the an embodiment of the present application is described in detail from the perspective of the terminal device, and a method for transmitting information according to another embodiment of the present application is described in detail from the perspective of the network device in combination with FIG. 10. It should be understood that the description on the network device side corresponds to that on the terminal device side, and reference may be made to the above for similar descriptions, which will not be repeated here in order to avoid duplication.

FIG. 10 is a schematic flowchart of a method 300 for transmitting information according to another embodiment of the present application, which may be executed by a network device in the communication system shown in FIG. 1. As shown in FIG. 10, the method 300 includes the following contents:

S310: a network device sends first information to a terminal device, the first information including information of multiple first physical uplink control channel (PUCCH) resources for carrying channel state information (CSI) in multiple cycles, where at least two first PUCCH resources in the multiple first PUCCH resources for carrying the CSI overlap at least partially in a time domain; and S320: the network device sends second information to the terminal device, where the second information includes information of a second PUCCH resource for carrying collision CSI.

In some embodiments, the first information further includes information of measuring resources for CSI measuring in the multiple cycles.

In some embodiments, a type of the multiple cycles includes at least one of the following: cyclical, quasi-cyclical and non-cyclical.

In some embodiments, the information of the second PUCCH resource includes at least one of the following:

a starting symbol in the time domain, a duration in the time domain, a starting physical resource block PRB in a frequency domain and a number of consecutive PRB in the frequency domain of the second PUCCH resource.

The method embodiments of the present application are described in detail above in combination with FIGS. 2 to 10, and the apparatus embodiments of the present application are described in detail below in combination with FIGS. 11 to 14, and it should be understood that the apparatus embodiments and the method embodiments correspond to each other, reference may be made to the method embodiments for similar descriptions.

Figure 11:
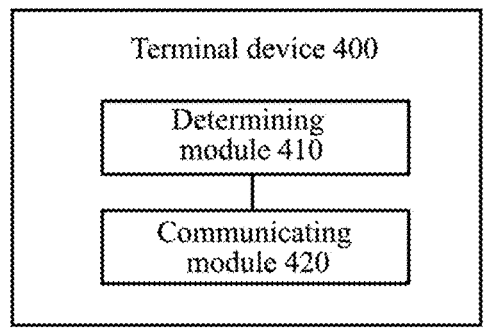
FIG. 11 illustrates a schematic block diagram of a terminal device according to an embodiment of the present application.

FIG. 11 illustrates a schematic block diagram of a terminal device 400 for transmitting information according to an embodiment of the present application. As shown in FIG. 11, the terminal 400 includes:

a determining module 410, configured to in a case where at least two first physical uplink control channel PUCCH resources in multiple first PUCCH resources for carrying channel state information CSI overlap at least partially in a time domain, determine target CSI to-be-reported to a network device according to a second PUCCH resource for transmitting collision CSI; and a communicating module 420, configured to report the target CSI to the network device through the second PUCCH resource.

In some embodiments, where the determining module 410 is further configured to:

determine the target CSI to-be-reported to the network device according to a starting position of the second PUCCH resource.

In some embodiments, where the determining module 410 is further configured to:

if there exists, in the multiple first PUCCH resources, at least one first PUCCH resource of which a starting position is no later than the starting position of the second PUCCH resource, determine CSI carried in the at least one first PUCCH resource as the target CSI.

In some embodiments, where the determining module 410 is further configured to:

if there exists, in the multiple first PUCCH resources, at least one first PUCCH resource of which a starting position is no later than the starting position of the second PUCCH resource, determine CSI carried in at least one first PUCCH resource with an earliest or a latest starting position in the at least one first PUCCH resource as the target CSI.

In some embodiments, where the determining module 410 is further configured to:

determine the target CSI according to the starting position of the second PUCCH resource and priorities of the CSI carried in the multiple first PUCCH resources.

In some embodiments, where the determining module 410 is further configured to:

if there exists, in the multiple first PUCCH resources, at least one first PUCCH resource of which a starting position is no later than the starting position of the second PUCCH resource, determine the target CSI according to priorities of CSI carried in the at least one first PUCCH resource.

In some embodiments, where the determining module 410 is further configured to:

determine at least one CSI with a highest priority in the CSI carried in the at least one first PUCCH resource as the target CSI.

In some embodiments, where the determining module 410 is further configured to:

if there exists, in the multiple first PUCCH resources, at least one first PUCCH resource of which a starting position is no later than the starting position of the second PUCCH resource, determine the target CSI according to priorities of CSI carried in a first PUCCH resource with an earliest or a latest starting position in the at least one first PUCCH resource.

In some embodiments, where the determining module 410 is further configured to:

determine CSI with a highest priority in the CSI carried in the first PUCCH resource with the earliest starting position as the target CSI.

In some embodiments, where the determining module 410 is further configured to:

determine the target CSI according to the starting position of the second PUCCH resource and measuring positions of multiple CSI carried in the multiple first PUCCH resources, where the multiple first PUCCH resources correspond to the multi-CSI one by one.

In some embodiments, where the determining module 410 is further configured to:

determine, according to a measuring position of each of CSI in the multiple CSI and a computation time of each of the CSI, a computation end position of each of the CSI; and determine the target CSI according to the starting position of the second PUCCH resource and the computation end position of each of the CSI.

In some embodiments, where the determining module 410 is further configured to:

if there exists, in the multiple CSI, at least one CSI of which a computation end position is no later than the starting position of the second PUCCH resource, determine the at least one CSI as the target CSI.

In some embodiments, where the determining module 410 is further configured to:

if there exists, in the multiple CSI, at least one CSI of which a computation end position is no later than the starting position of the second PUCCH resource, determine CSI with an earliest computation end position in the at least one CSI as the target CSI.

In some embodiments, where the determining module 410 is further configured to:

determine the target CSI according to the starting position of the second PUCCH resource and the computation end position of each of the CSI, and a priority of each of the CSI.

In some embodiments, where the determining module 410 is further configured to:

if there exists, in the multiple CSI, at least one CSI of which a computation end position is no later than the starting position of the second PUCCH resource, determine the target CSI according to a priority of the at least one CSI.

In some embodiments, where the determining module 410 is further configured to:

determine CSI with a highest priority in the at least one CSI as the target CSI.

In some embodiments, where the determining module 410 is further configured to:

if there exists, in the multiple CSI, at least one CSI of which a computation end position is no later than the starting position of the second PUCCH resource, determine the target CSI according to priorities of CSI with an earliest computation end position in the at least one CSI.

In some embodiments, where the determining module 410 is further configured to:

determine CSI with a highest priority in the CSI with the earliest computation end position in the at least one CSI as the target CSI.

In some embodiments, where the determining module 410 is further configured to:

determine a position of a specific duration after the measuring position of each of the CSI as the computation end position of each of the CSI, where the specific duration is a sum of timing advanced TA and the computation time of each of the CSI.

In some embodiments, where the starting position of the second PUCCH resource is a starting symbol of the second PUCCH resource.

In some embodiments, where the communicating module 420 is further configured to:

receive first information sent by the network device, where the first information includes information of the multiple first PUCCH resources for carrying CSI in multiple cycles.

In some embodiments, where the first information further includes information of measuring resources for CSI measuring in the multiple cycles.

In some embodiments, where a type of the multiple cycles includes at least one of the following: cyclical, quasi-cyclical and non-cyclical.

In some embodiments, where the communicating module is further configured to:

receive second information sent by the network device, where the second information includes information of a second PUCCH resource for carrying collision CSI.

In some embodiments where the information of the second PUCCH resource includes at least one of the following:

a starting symbol in the time domain, a duration in the time domain, a starting physical resource block PRB in a frequency domain and a number of consecutive PRB in the frequency domain of the second PUCCH resource.

In some embodiments, where the at least two first physical uplink control channel PUCCH resources in multiple first PUCCH resources for carrying channel state information CSI overlap at least partially in a time domain includes:

there exists at least two first PUCCH resources in the multiple first PUCCH resources overlapping on at least one symbol in the time domain.

It should be understood that the terminal device 400 for transmitting information according to the embodiments of the present application may correspond to the terminal device in the method embodiments of the present application, and that the above and other operations and/or functions of the units in the terminal device 400 are for realizing the corresponding processes of the terminal device in the method 200 shown in FIG. 2 respectively, which will not be repeated herein again for the sake of brevity.

Figure 12:
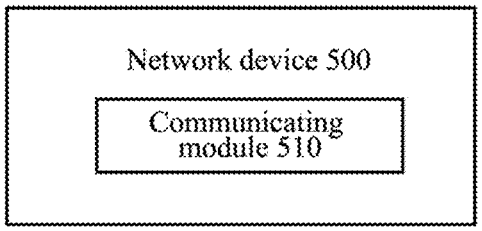
FIG. 12 illustrates a schematic block diagram of a network device according to an embodiment of the present application.

FIG. 12 is a schematic block diagram of a device for transmitting information according to an embodiment of the present application. The network device 500 in FIG. 12 includes:

a communicating module 510, configured to send first information to a terminal device, the first information including information of multiple first physical uplink control channel (PUCCH) resources for carrying channel state information (CSI) in multiple cycles, where at least two first PUCCH resources in the multiple first PUCCH resources for carrying the CSI overlap at least partially in a time domain; and send second information to the terminal device, where the second information includes information of a second PUCCH resource for carrying collision CSI.

In some embodiments, the first information may further include information of measuring resources for CSI measuring in the multiple cycles.

In some embodiments, a type of the multiple cycles includes at least one of the following: cyclical, quasi-cyclical and non-cyclical.

In some embodiments, the information of the second PUCCH resource includes at least one of the following:

a starting symbol in the time domain, a duration in the time domain, a starting physical resource block PRB in a frequency domain and a number of consecutive PRB in the frequency domain of the second PUCCH resource.

Specifically, the network device 500 may correspond to (e.g., may be configured or itself) the network device described in the above-mentioned method 300, and the modules or units of the network device 500 are configured to perform the actions or processes performed by the network device in the above-mentioned method 300 respectively, the detailed description of which is omitted in order to avoid duplication.

Figure 13:
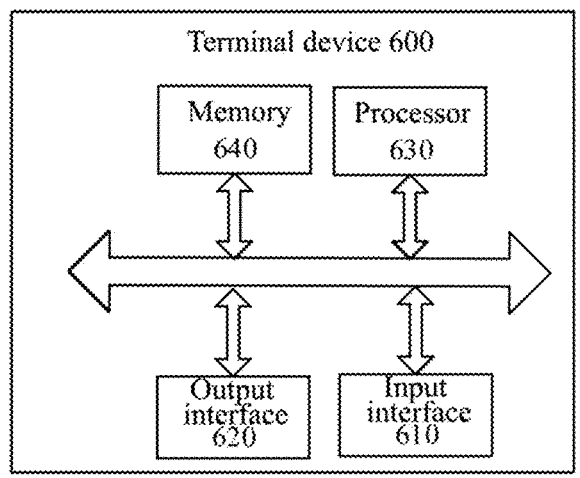
FIG. 13 illustrates a schematic block diagram of a terminal device according to another embodiment of the present application.

As shown in FIG. 13, the embodiments of the present application also provide a terminal device 600, which may be the terminal device 400 in FIG. 11 and which may be configured to execute the content of the terminal device corresponding to the method 200 in FIG. 2. The terminal device 600 includes an input interface 610, an output interface 620, a processor 630 and a memory 640, the input interface 610, the output interface 620, the processor 630 and the memory 640 may be connected through a bus system. The memory 640 is configured to store programs, instructions or codes. The processor 630 is configured to execute the programs, instructions or codes in the memory 640 to control the input interface 610 to receive a signal, control the output interface 620 to send a signal and complete the operations in the method embodiments described above.

It should be understood that in the embodiments of the present application, the processor 630 may be a central processing unit (CPU for short) and the processor 630 may also be other general-purpose processor, a digital signal processor (DSP), an application specific integrated circuit (ASIC), a field programmable gate array (FPGA) or other programmable logic devices, a discrete gate or a transistor logic device, a discrete hardware component, etc. The general-purpose processor may be a microprocessor or any conventional processor or the like.

The memory 640 may include a read-only memory and a random access memory, and provide instructions and data to the processor 630. A portion of the memory 640 may also include a nonvolatile random access memory. For example, the memory 640 may also store information about a device type.

In the implementation process, the contents of the above method may be accomplished by the integrated logic circuit of the hardware in processor 630 or the instructions in the form of software. The contents of the method disclosed in conjunction with the embodiments of the present application may be directly implemented by a hardware processor, or may be performed by a combination of hardware and software modules in the processor. Software modules may be located in a random access memory, a flash memory, a read-only memory, a programmable read-only memory or an electrical erasable programmable memory, a register and other mature storage mediums in the art. The storage medium is located in memory 640, and processor 630 reads the information in the memory 640, and completes the contents of the method described above in combination with its hardware. To avoid duplication, the description here is not illustrated in detail.

In a specific implementation, the determining module 410 included in the terminal device 400 in FIG. 11 may be implemented by the processor 630 in FIG. 13, and the communicating module 420 included in the terminal device 400 in FIG. 11 may be implemented by the input interface 610 and the output interface 620 in FIG. 13.

Figure 14:
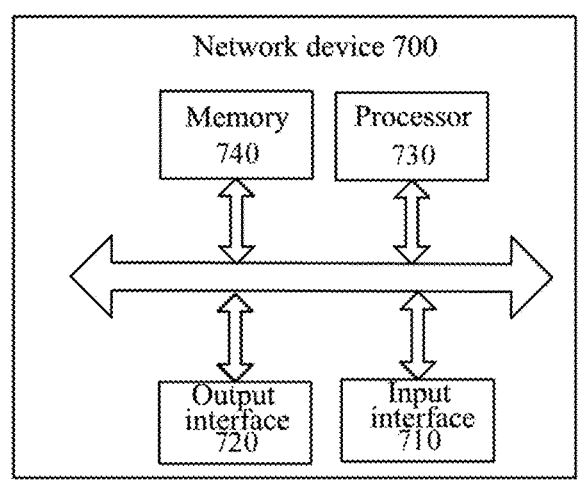
FIG. 14 illustrates a schematic block diagram of a network device according to another embodiment of the present application.

As shown in FIG. 14, an embodiment of the present application also provides a network device 700, which may be the network device 500 in FIG. 12 and which may be configured to execute the content of the network device corresponding to the method 300 in FIG. 10. The network device 700 includes: an input interface 710, an output interface 720, a processor 730 and a memory 740, and the input interface 710, output interface 720, processor 730 and memory 740 may be connected through a bus system. The memory 740 is configured to store programs, instructions or codes. The processor 730 is configured to execute the programs, instructions or codes in the memory 740 to control the input interface 710 to receive a signal, control the output interface 720 to send a signal and complete the operations in the embodiments of the method described above.

It should be understood that in the embodiments of the present application, the processor 730 may be a central processing unit (CPU for short) and the processor 730 may also be other general purpose processor, a digital signal processor (DSP), an application specific integrated circuit (ASIC), a field programmable gate array (FPGA) or other programmable logic devices, a discrete gate or a transistor logic device, a discrete hardware component, etc. The general purpose processor may be a microprocessor or any conventional processor or the like.

The memory 740 may include a read-only memory and a random access memory, and provide instructions and data to the processor 730. A portion of the memory 740 may also include a nonvolatile random access memory. For example, the memory 740 may also store information about a device type.

In the implementation process, the contents of the above method may be accomplished by the integrated logic circuit of the hardware in processor 730 or the instructions in the form of software. The contents of the method disclosed in conjunction with the embodiments of the present application may be directly implemented by a hardware processor, or may be performed by a combination of hardware and software modules in the processor. Software modules may be located in a random access memory, a flash memory, a read-only memory, a programmable read-only memory or an electrical erasable programmable memory, a register and other mature storage mediums in the art. The storage medium is located in memory 740, and processor 730 reads the information in memory 740, and completes the contents of the method with its hardware. To avoid duplication, the description here is not illustrated in detail.

In a specific implementation, the communicating module 510 included in the network device 500 in FIG. 12 may be implemented by the input interface 710 and the output interface 720 in FIG. 14.

The embodiments of the present application also provide a computer readable storage medium that stores one or more programs including instructions that, when executed by a portable electronic device including multiple applications, cause the portable electronic device to execute the method according to the embodiments shown in FIGS. 2 to 10.

The embodiments of the present application also provide a computer program, which includes instructions and which when executed by a computer, causes the computer to execute the corresponding flow of the method according to the embodiments shown in FIGS. 2 to 10.

Those of ordinary skill in the art will appreciate that elements and algorithm steps of the various examples described in connection with the embodiments disclosed herein can be implemented in electronic hardware or a combination of computer software and electronic hardware. Whether these functions are implemented in hardware or software depends on a specific application and design constraints of the technical scheme. Professionals can use different methods for each specific application to implement the described functionality, but this kind of implementation should not be considered beyond the scope of the present application.

A person skilled in the art can clearly understand that for the convenience and brevity of the description, specific working processes of a system, a device and a unit described above can refer to the corresponding processes in the foregoing method embodiments, and details are not described herein again.

In the several embodiments provided by the present application, it should be understood that the disclosed system, device, and method may be implemented in other manners. For example, the device embodiments described above are merely illustrative. For example, the division of the unit is only a logical function division, in actual implementation, there may be another division manner, for example, multiple units or components may be combined or can be integrated into another system, or some features can be ignored or not executed. In addition, the mutual coupling or direct coupling or communication connection shown or discussed may be an indirect coupling or communication connection through some interfaces, devices or units, and may be electrical, mechanical or otherwise.

The units described as separate components may or may not be physically separated, and the components displayed as units may or may not be physical units, that is, may be located in one site, or may be distributed to multiple network units. Some or all of the units may be selected according to actual needs to achieve the purpose of the solution of the embodiments.

Furthermore, each functional unit in the embodiments of the present application may be integrated into one processing unit, or each unit may be separate physically, or two or more units may be integrated into one unit.

The functions may be stored in a computer readable storage medium if implemented in the form of a software functional unit and sold or used as a standalone product. Based on such understanding, the technical solution of the present application, in nature, or which makes contributions to the prior art, or a part of the technical solution, may be embodied in the form of a software product, which is stored in a storage medium, where a plurality of instructions are included to cause a computer device (which may be a personal computer, a server, or a network device, etc.) to perform all or part of the steps of the method described in the embodiments of the present application. The foregoing storage medium includes: a USB flash disk, a mobile hard disk, a read-only memory (ROM), a random access memory (RAM), a magnetic disk, or an optical disk, and the like which can store program codes.

The foregoing description is only specific embodiments of the present application; however, the scope of protection of the present application is not limited thereto, and changes or substitutions that can be readily think of by any person skilled in the art within the technical scope disclosed in the present application shall be covered by the scope of protection of the present application. Therefore, the scope of protection of the present application shall be subject to the scope of protection of the claims.

What is claimed is:

1. A terminal device, comprising a processor and a memory, the memory being configured to store an instruction, and the processor being configured to execute the instruction stored in the memory to:
   in a case where at least two first physical uplink control channel (PUCCH) resources in multiple first PUCCH resources for carrying channel state information (CSI) overlap at least partially in a time domain, determine at least one CSI with a highest priority in CSI carried in the at least two first PUCCH resources as target CSI to-be-reported to a network device; and
   control the terminal device to report the target CSI to the network device through a second PUCCH resource for transmitting collision CSI, wherein the first PUCCH resources are different from the second PUCCH resource;
   wherein the processor is further configured to:
   control the terminal device to receive first information sent by the network device, wherein the first information comprises information of the multiple first PUCCH resources for carrying CSI in multiple cycles and information of measuring resources for CSI measuring in the multiple cycles; and
   control the terminal device to receive second information sent by the network device, wherein the second information comprises information of the second PUCCH resource for carrying collision CSI, and the information of the second PUCCH resource comprises at least one of the following: a starting symbol in the time domain, a duration in the time domain, a starting physical resource block (PRB) in a frequency domain and a number of consecutive PRB in the frequency domain of the second PUCCH resource.

2. The terminal device according to claim 1, wherein a type of the multiple cycles comprises at least one of the following: cyclical, quasi-cyclical and non-cyclical.

3. The terminal device according to claim 1, wherein the at least two first PUCCH resources in multiple first PUCCH resources for carrying CSI overlap at least partially in a time domain comprises:
   there exists at least two first PUCCH resources in the multiple first PUCCH resources overlapping on at least one symbol in the time domain.

4. A method for transmitting information, comprising:
   in a case where at least two first physical uplink control channel (PUCCH) resources in multiple first PUCCH resources for carrying channel state information (CSI) overlap at least partially in a time domain, determining, by a terminal device, at least one CSI with a highest priority in CSI carried in the at least two first PUCCH resources as target CSI to-be-reported to a network device; and
   reporting, by the terminal device, the target CSI to the network device through a second PUCCH resource for transmitting collision CSI, wherein the first PUCCH resources are different from the second PUCCH resource;

wherein the method further comprises:

receiving, by the terminal device, first information sent by the network device, wherein the first information comprises information of the multiple first PUCCH resources for carrying CSI in multiple cycles and information of measuring resources for CSI measuring in the multiple cycles; and receiving, by the terminal device, second information sent by the network device, wherein the second information comprises information of the second PUCCH resource for carrying collision CSI, wherein the information of the second PUCCH resource comprises at least one of the following: a starting symbol in the time domain, a duration in the time domain, a starting physical resource block (PRB) in a frequency domain and a number of consecutive PRB in the frequency domain of the second PUCCH resource.

5. A method for transmitting information, comprising:

sending, by a network device, first information to a terminal device, the first information comprising information of multiple first physical uplink control channel (PUCCH) resources for carrying channel state information (CSI) in multiple cycles and information of measuring resources for CSI measuring in the multiple cycles, wherein at least two first PUCCH resources in the multiple first PUCCH resources for carrying CSI overlap at least partially in a time domain, and at least one CSI with a highest priority in CSI carried in the at least two first PUCCH resources is determined by the terminal device as target CSI; and sending, by the network device, second information to the terminal device, wherein the second information comprises information of a second PUCCH resource for carrying collision CSI, and the information of the second PUCCH resource comprises at least one of the following: a starting symbol in the time domain, a duration in the time domain, a starting physical resource block (PRB) in a frequency domain and a number of consecutive PRB in the frequency domain of the second PUCCH resource, the second PUCCH resource for carrying the collision CSI is used for reporting the target CSI to the network device, and the first PUCCH resources are different from the second PUCCH resource.

6. The method according to claim 5, wherein a type of the multiple cycles comprises at least one of the following: cyclical, quasi-cyclical and non-cyclical.

7. A network device, comprising a processor and a memory, the memory being configured to store an instruction, and the processor being configured to execute the instruction stored in the memory to:

control the network device to send first information to a terminal device, the first information comprising information of multiple first physical uplink control channel (PUCCH) resources for carrying channel state information (CSI) in multiple cycles and information of measuring resources for CSI measuring in the multiple cycles, wherein at least two first PUCCH resources in the multiple first PUCCH resources for carrying CSI overlap at least partially in a time domain, and at least one CSI with a highest priority in CSI carried in the at least two first PUCCH resources is determined as target CSI; and control the network device to send second information to the terminal device, wherein the second information comprises information of a second PUCCH resource for carrying collision CSI, and the information of the second PUCCH resource comprises at least one of the following: a starting symbol in the time domain, a duration in the time domain, a starting physical resource block (PRB) in a frequency domain and a number of consecutive PRB in the frequency domain of the second PUCCH resource, the second PUCCH resource for carrying the collision CSI is used for reporting the target CSI to the network device, and the first PUCCH resources are different from the second PUCCH resource.

8. The network device according to claim 7, wherein a type of the multiple cycles comprises at least one of the following: cyclical, quasi-cyclical and non-cyclical.

9. The method according to claim 4, wherein a type of the multiple cycles comprises at least one of the following: cyclical, quasi-cyclical and non-cyclical.

10. The method according to claim 4, wherein the at least two first PUCCH resources in multiple first PUCCH resources for carrying CSI overlap at least partially in a time domain comprises:

there exists at least two first PUCCH resources in the multiple first PUCCH resources overlapping on at least one symbol in the time domain.

11. The method according claim 5, wherein the at least two first PUCCH resources in multiple first PUCCH resources for carrying CSI overlap at least partially in a time domain comprises:

there exists at least two first PUCCH resources in the multiple first PUCCH resources overlapping on at least one symbol in the time domain.

12. The network device according to claim 7, wherein the at least two first PUCCH resources in multiple first PUCCH resources for carrying CSI overlap at least partially in a time domain comprises:

there exists at least two first PUCCH resources in the multiple first PUCCH resources overlapping on at least one symbol in the time domain.

\* \* \* \* \*